United States Patent

Murata et al.

(10) Patent No.: US 6,881,692 B2
(45) Date of Patent: Apr. 19, 2005

(54) ALKALI-FREE GLASS AND GLASS PLATE FOR A DISPLAY

(75) Inventors: Takashi Murata, Moriyama (JP); Shinkichi Miwa, Kusatsu (JP)

(73) Assignee: Nippon Electric Glass Co., LTD, Tokyo (JP)

( * ) Notice: Subject to any disclaimer, the term of this patent is extended or adjusted under 35 U.S.C. 154(b) by 0 days.

(21) Appl. No.: 10/059,833

(22) Filed: Jan. 30, 2002

(65) Prior Publication Data

US 2002/0151426 A1 Oct. 17, 2002

(30) Foreign Application Priority Data

Feb. 1, 2001 (JP) ........................................ 2001-026116
May 17, 2001 (JP) ........................................ 2001-147782

(51) Int. Cl.$^7$ .................... C03C 3/091; C03C 3/093; C03C 3/087
(52) U.S. Cl. .................. 501/66; 501/67; 501/70
(58) Field of Search ................. 501/66, 67, 70

(56) References Cited

U.S. PATENT DOCUMENTS

| | | |
|---|---|---|
| 5,851,939 A | 12/1998 | Miwa |
| 6,060,168 A | 5/2000 | Kohli |
| 6,169,047 B1 | 1/2001 | Nishizawa |
| 6,417,124 B1 * | 7/2002 | Peuchert et al. ............. 501/66 |
| 6,465,381 B1 * | 10/2002 | Lautenschlager et al. ..... 501/67 |
| 2002/0032117 A1 * | 3/2002 | Peuchert et al. ............. 501/66 |

FOREIGN PATENT DOCUMENTS

| | | | |
|---|---|---|---|
| DE | 10000836 A1 * | 7/2001 | ........... C03C/3/078 |
| EP | 0 714 862 | 6/1996 | |
| EP | 1070681 A1 * | 1/2001 | ........... C03C/3/095 |
| JP | 63030347 | 9/1988 | |
| JP | 11-49520 | 2/1999 | |

\* cited by examiner

*Primary Examiner*—Karl Group
*Assistant Examiner*—Elizabeth A. Bolden
(74) *Attorney, Agent, or Firm*—Collard & Roe, P.C.

(57) ABSTRACT

An alkali-free glass consists essentially of, in mass percent, 58–70% $SiO_2$, 10–19% $Al_2O_3$, 6.5–15% $B_2O_3$, 0–2% MgO, 3–12% CaO, 0.1–5% BaO, 0–4% SrO, 0.1–6% BaO+SrO, 0–5% ZnO, 5–15% MgO+CaO+BaO+SrO+ZnO, 0–5% $ZrO_2$, 0–5% $TiO_2$, and 0–5% $P_2O_5$. The alkali-free glass contains substantially no alkali metal oxide and has a density of 2.45g/cm$^3$ or less, an average coefficient of thermal expansion of $25 \times 10^{-7}/°$ C.$-36 \times 10^{-7}/°$ C. within a temperature range between 30 and 380° C., and a strain point not lower than 640° C.

14 Claims, No Drawings

ALKALI-FREE GLASS AND GLASS PLATE FOR A DISPLAY

BACKGROUND OF THE INVENTION

This invention relates to an alkali-free glass adapted to form a glass plate for use as a display substrate of a flat display, such as a liquid crystal display (LCD) and an electro luminescence (EL) display, a glass plate for use in an image sensor, such as a charge coupled device (CCD) and a contact image sensor (CIS), a solar cell, and the like. This invention also relates to a glass plate using the alkali-free glass.

Presently, use is widely made of a flat display, such as an LCD and an EL display. In particular, an electronic device such as an active matrix thin film transistor LCD (TFT-LCD) is small in thickness and low in power consumption and is therefore used in various applications, for example, in a car navigation system and a finder of a digital camera and, recently, in a monitor of a personal computer and a TV. As a display substrate of the flat display, a glass plate is widely used.

A TFT-LCD panel maker attempts to improve the productivity and to reduce the cost by providing a plurality of devices on a glass plate (blank plate) formed by a glass maker and cutting the glass plate to individually separate the devices as products. Recently in the applications such as the monitor of the personal computer and the TV, the device itself is required to be large in size. In order to obtain a plurality of such large-sized devices, there is a demand for a glass plate having a large area, for example, having a size of 1000×1200 mm.

On the other hand, a mobile apparatus, such as a mobile telephone and a notebook-type personal computer, is required to be light in weight so that it is conveniently and easily carried by a user. Consequently, the glass plate is also required to be light in weight. In order to lighten the weight of the glass plate, the reduction in thickness is effective. At present, the glass plate for the TFT-LCD typically has a thickness as very small as about 0.7 mm.

However, the glass plate having such a large size and such a thin thickness exhibits large sag due to its weight. This causes a serious problem in a production process as follows.

In the glass maker, the glass plate of the type is formed and then subjected to various steps such as cutting, annealing, testing, and cleaning. In these steps, the glass plate is loaded into and unloaded from a cassette having multi-deck shelves. In detail, the cassette is provided with the shelves formed on two inner surfaces on left and right sides or on three inner surfaces on left, right, and back sides. The glass plate is held in a horizontal position with its two opposite sides or three sides supported on the shelves. As described above, the glass plate of a large size and a thin thickness exhibits large sag. Therefore, when the glass plate is put onto the shelves of the cassette, a part of the glass plate is often brought into contact with the cassette or another glass plate to be broken. On the other hand, when the glass plate is taken out from the shelves of the cassette, the glass plate may be heavily shaken to become unstable. In the display maker also, a similar cassette is used and similar problems occur.

The sag of the glass plate due to its weight varies in direct proportion to the density of a glass or a glass material forming the glass plate and in inverse proportion to the Young's modulus. Therefore, in order to suppress the sag of the glass plate, the specific modulus given by the ratio of Young's modulus/density must be increased. To this end, the glass must have a high Young's modulus and a low density. Even with the same specific modulus, the glass having a lower density, i.e., relatively light per unit volume allows the glass plate having the same weight to be increased in thickness. The sag of the glass plate varies in inverse proportion to a square of the thickness. Therefore, such increase in thickness of the glass plate is very effective in suppressing the sag. The low density of the glass is also effective in reducing the weight of the glass plate. Thus, the density of the glass is preferably as low as possible.

Generally, an alkali-free glass of the type contains a relatively large amount of alkaline earth metal oxide. In order to lower the density of the glass, it is effective to reduce the content of the alkaline earth metal oxide. However, the alkaline earth metal oxide is a component enhancing the meltability of the glass and the reduction in content thereof decreases the meltability. The decrease in meltability of the glass results in easy occurrence of internal defects such as seeds and stones. The seeds and the stones present in the glass are serious defects as a glass plate for a display because transmission of light is prevented. In order to suppress such internal defects, the glass must be melted at a high temperature for a long time.

However, melting at a high temperature increases the load upon a glass melting furnace. For example, a refractory such as alumina or zirconia used as a material of the furnace is more heavily eroded as the temperature is higher. In this event, the life of the furnace is shortened. In addition, appliances and equipments which can be used at a high temperature are restricted and relatively high in cost. Furthermore, in order to continuously keep the interior of the furnace at a high temperature, the running cost is high as compared with a glass meltable at a low temperature. Thus, melting at a high temperature is very disadvantageous in production of the glass. It is therefore desired to provide an alkali-free glass meltable at a low temperature.

As another important requirement, the glass plate of the type must have a thermal shock resistance. At an end face of the glass plate, microscopic flaws and cracks are present even if chamfering is performed. In case where thermal tensile stress is concentrated to the flaws and the cracks, the glass plate may possibly be broken. The breakage of the glass plate decreases an operation rate of a production line. In addition, fine glass particles scattered upon breakage may be adhered to another glass plate to cause a line interruption or a patterning error in an electronic circuit to be formed thereon.

The recent development of the TFT-LCD is addressed not only to a wider screen and a lighter weight but also to the improvement in performance, such as a higher definition, a higher-speed response, and a higher aperture ratio. Most recently, for the purpose of improving the performance of the LCD and reducing the weight, development of a poly-crystal silicon TFT-LCD (p-Si•TFT-LCD) is energetically carried out. An existing p-Si•TFT-LCD requires a production process temperature as very high as 800° C. or more. Such a high production process temperature allows the use of a silica glass plate alone. However, the production process temperature is lowered to a level of 400 to 600° C. as a result of the recent development. Therefore, an alkali-free glass plate is brought into use for production of the p-Si•TFT-LCD, like in an amorphous silicon TFT-LCD (a-Si•TFT-LCD) presently produced in a large amount.

As compared with a production process of the a-Si•TFT-LCD, a production process of the p-Si•TFT-LCD includes more heat treating steps. The glass plate is repeatedly subjected to rapid heating and rapid cooling so that thermal shock upon the glass plate is greater. As described above, the glass plate is increased in size. Consequently, the glass plate is susceptible to temperature distribution. In addition, occurrence of microscopic flaws and cracks at the end face of the glass plate may be caused at a high probability. This means that the glass plate may be broken in the heat treating steps at a high probability. One of the most basic and effective approaches to solve the above-mentioned problem is to reduce thermal stress resulting from the difference in thermal expansion. To this end, a glass having a low coefficient of thermal expansion is required. If the difference in thermal expansion between the glass and a material of a thin film transistor (TFT) is increased, the glass plate will be warped. Therefore, it is required for the glass to have a coefficient of thermal expansion approximate to that (about $30-33\times10^{-7}/°$ C.) of the TFT material such as p-Si.

The production process temperature of the p-Si•TFT-LCD is recently lowered as described above but is yet considerably high as compared with the production process temperature of the a-Si•TFT-LCD. If the glass plate has a low heat resistance, small shrinkage in dimension called heat shrinkage occurs when the glass plate is exposed to a high temperature of 400 to 600° C. during the production process of the p-Si•TFT-LCD. The heat shrinkage may possibly cause a pixel pitch error of the TFT to result in a display defect. If the glass plate has a lower heat resistance, the glass plate may be deformed and warped. Furthermore, a pattern error may possibly be caused due to the heat shrinkage of the glass plate in a liquid crystal producing step such as a film deposition step. In view of the above, the glass excellent in heat resistance is required.

On the surface of the glass plate for the TFT-LCD, a transparent conductive film, an insulating film, a semiconductor film, a metal film, and the like are deposited and various circuits and patterns are formed by photolithography etching (photo-etching). In the film deposition step and the photo-etching step, the glass plate is subjected to various kinds of heat treatments and chemical treatments.

Therefore, if the glass contains alkali metal oxides ($Na_2O$, $K_2O$, $Li_2O$), alkali ions are diffused in a deposited semiconductor material during the heat treatments to deteriorate film characteristics. Accordingly, it is required for the glass to contain substantially no alkali metal oxide and to have a chemical resistance such that no deterioration is caused by various chemicals, such as acids and alkalis, used in the photo-etching step.

Generally, a TFT array process comprises a repetition of a film deposition step, a resist pattern forming step, an etching step, and a resist removing step. As an etchant, use may be made of a variety of chemical solutions, for example, a phosphoric acid solution for etching of an Al- or Mo-based film, an aqua regia ($HCl+HNO_3$) solution for etching of an ITO film, a buffered hydrofluoric acid (BHF) solution for a $SiN_x$ or a $SiO_2$ film. In order to save the cost, the etchant is not disposed of after single use but is recycled through a liquid circulating system.

If the glass plate has a low chemical resistance, the glass plate reacts with the etchant in the etching step to produce a reaction product which chokes or clogs a filter in the liquid circulating system. In addition, nonuniform etching causes haze of the surface of the glass. Furthermore, change in components of the etchant makes an etching rate unstable. Thus, various problems may possibly arise. In particular, a hydrofluoric acid solution such as BHF heavily erodes the glass plate and, therefore, tends to cause the above-mentioned problems. Accordingly, the glass plate is required to be excellent particularly in BHF resistance.

As regards the chemical resistance of the glass plate, it is important not only to be small in erosion but also to cause no change in appearance. Specifically, the small erosion of the glass plate by the chemical solution is very important in the sense of preventing contamination of the chemical solution and clogging of the filter by the reaction product during the etching step. As a display substrate for which a light transmittance is important, it is an indispensable characteristic that any change in appearance of the glass, such as haze or roughness, is not caused by the chemical treatment. The results of evaluation of the erosion and the change in appearance are not necessarily coincident particularly with respect to the BHF resistance. For example, those glasses exhibiting the same erosion may cause or may not cause the change in appearance after the chemical treatment, depending upon the compositions.

In the meanwhile, the glass plate for the TFT-LCD is mainly formed by the down-draw process or the float process. The down-draw process includes the slot down-draw process and the overflow down-draw process. The down-draw process is advantageous in view of the reduction in cost because the glass plate formed in this method need not be polished. However, in case where the glass plate is formed by the down-draw process, the glass tends to be devitrified. Therefore, the glass must have an excellent devitrification resistance.

presently, as the glass plate for the TFT-LCD, 1737 glass manufactured by Corning Incorporated and OA-10 glass manufactured by Nippon Electric Glass Co., Ltd., and so on are commercially available. These glasses have a strain point of about 650° C. and are therefore excellent in heat resistance. However, each glass is high in coefficient of thermal expansion and density. Therefore, if it is used as the glass plate for the p-Si•TFT-LCD, the thermal shock resistance is insufficient. In addition, the glass is heavy. This makes it difficult to increase the size and to reduce the thickness.

SUMMARY OF THE INVENTION

It is therefore an object of this invention to provide an alkali-free glass adapted to produce a glass plate used in a display substrate and the like.

It is another object of this invention to provide a glass plate produced by the use of the alkali-free glass mentioned above.

It is still another object of this invention to provide a liquid crystal display comprising the glass plate mentioned above.

According to this invention, there is provided an alkali-free glass consisting essentially of, in mass percent, 58–70% $SiO_2$, 10–19% $Al_2O_3$, 6.5–15% $B_2O_3$, 0–2% MgO, 3–12% CaO, 0.1–5% BaO, 0–4% SrO, 0.1–6% BaO+SrO, 0–5% ZnO, 5–15% MgO+CaO+BaO+SrO+ZnO, 0–5% $ZrO_2$, 0–5% $TiO_2$, and 0–5% $P_2O_5$, containing substantially no alkali metal oxide, and having a density of 2.45 g/cm³ or less, an average coefficient of thermal expansion of $25\times10^{-7}/°$ C.–$36\times10^{-7}/°$ C. within a temperature range between 30 and 380° C., and a strain point not lower than 640° C.

According to this invention, there is also provided a glass plate formed by an alkali-free glass consisting essentially of, in mass percent, 58–70% $SiO_2$, 10–19% $Al_2O_3$, 6.5–15% $B_2O_3$, 0–2% MgO, 3–12% CaO, 0.1–5% BaO, 0–4% SrO, 0.1–6% BaO+SrO, 0–5% ZnO, 5–15% MgO+CaO+BaO+SrO+ZnO, 0–5% $ZrO_2$, 0–5% $TiO_2$, and 0–5% $P_2O_5$, containing substantially no alkali metal oxide, and having a density of 2.45 g/cm³ or less, an average coefficient of thermal expansion of $25\times10^{-7}/°C.–36\times10^{-7}/°C.$ within a temperature range between 30 and 380° C., and a strain point not lower than 640° C.

According to this invention, there is also provided a liquid crystal display comprising a glass plate formed by an alkali-free glass consisting essentially of, in mass percent, 58–70% $SiO_2$, 10–19% $Al_2O_3$, 6.5–15% $B_2O_3$, 0–2% MgO, 3–12% CaO, 0.1–5% BaO, 0–4% SrO, 0.1–6% BaO+SrO, 0–5% ZnO, 5–15% MgO+CaO+BaO+SrO+ZnO, 0–5% $ZrO_2$, 0–5% $TiO_2$, and 0–5% $P_2O_5$, containing substantially no alkali metal oxide, and having a density of 2.45 g/cm³ or less, an average coefficient of thermal expansion of $25\times10^{-7}/°C.–36\times10^{-7}/°C.$ within a temperature range between 30 and 380° C., and a strain point not lower than 640° C.

DESCRIPTION OF THE PREFERRED EMBODIMENTS

An alkali-free glass according to an embodiment of this invention contains substantially no alkali metal oxide and consists essentially of, in mass percent, 58–70% $SiO_2$, 10–19% $Al_2O_3$, 6.5–15% $B_2O_3$, 0–2% MgO, 3–12% CaO, 0.1–5% BaO, 0–4% SrO, 0.1–6% BaO+SrO, 0–5% ZnO, 5–15% MgO+CaO+BaO+SrO+ZnO, 0–5% $ZrO_2$, 0–5% $TiO_2$, and 0–5% $P_2O_5$. The above-mentioned composition is determined taking into account the strain point, the density, the coefficient of thermal expansion, the chemical resistance, the specific modulus, the meltability, and the formability of the alkali-free glass. The alkali-free glass thus obtained has a density of 2.45 g/cm³ or less, an average coefficient of thermal expansion of $25\times10^{-7}/°C.–36\times10^{-7}/°C.$ within a temperature range between 30 and 380° C., and a strain point not lower than 640° C. Thus, it is possible to provide the alkali-free glass excellent in thermal shock resistance, exhibiting no warp because the coefficient of thermal expansion is approximate to that of a TFT material, light in weight, reduced in sag, and small in heat shrinkage.

Preferably, the density is not higher than 2.40 g/cm³. The average coefficient of thermal expansion is preferably within a range between $28\times10^{-7}/°C.$ and $35\times10^{-7}/°C.$ The strain point is preferably not lower than 650° C., more preferably not lower than 660° C.

In the above-mentioned alkali-free glass, the liquidus temperature is not higher than 1150° C., preferably not higher than 1130° C., more preferably not higher than 1100° C. The viscosity at the liquidus temperature is not lower than $10^{5.4}$ dPa·s, preferably not lower than $10^{6.0}$ dPa·s. Therefore, a glass plate obtained by forming the alkali-free glass into a plate-like shape by the down-draw process exhibits no devitrification and can be reduced in production cost by omitting a polishing step.

When the alkali-free glass is treated in a 10% HCl aqueous solution at 80° C. for 24 hours, the erosion is not greater than 10 μm. When the alkali-free glass is treated in a 10% HCl aqueous solution at 80° C. for 3 hours, neither haze nor roughness on the surface is confirmed by visual observation. When the alkali-free glass is treated in a 130 BHF solution at 20° C. for 30 minutes, the erosion is not greater than 0.8 μm. When the alkali-free glass is treated in a 63 BHF solution at 20° C. for 30 minutes, neither haze nor roughness on the surface is confirmed by visual observation. Thus, the alkali-free glass has an excellent chemical resistance.

The specific modulus is not smaller than 27.5 GPa/(g·cm⁻³), preferably 29.0 GPa/(g·cm⁻³). Therefore, the sag of the glass plate after formed can be reduced. Since the glass melt has a temperature not higher than 1650° C. at the viscosity of $10^{2.5}$ dPa·s, the meltability is excellent.

The glass plate mentioned above has a low density and a high specific modulus. Therefore, even if the thickness of the glass plate is reduced to 0.6 mm or less (for example, 0.5 mm or less), the sag is small as compared with the existing glass plate. It is consequently possible to prevent the glass plate from being broken when it is put on and taken out from shelves in a cassette. Thus, the glass plate is suitable for use as a display substrate.

Next, description will be made of the reason why the content of each component of the above-mentioned alkali-free glass is determined as specified above.

The above-mentioned alkali-free glass contains 58–70% $SiO_2$. If the content is less than 58%, the chemical resistance, particularly, the acid resistance is degraded and the low density is difficult to achieve. On the other hand, if the content is more than 70%, the high-temperature viscosity is increased to degrade the meltability and the defect of a devitrification stone (cristobalite) is readily caused in the glass. The content of $SiO_2$ is preferably not smaller than 60% (more preferably not smaller than 62%) and not greater than 68% (more preferably not greater than 66%).

The content of $Al_2O_3$ is 10–19%. If the content is less than 10%, the strain point not lower than 640° C. is difficult to obtain. $Al_2O_3$ serves to improve the Young's modulus of the glass and to increase the specific modulus. If the content of $Al_2O_3$ is less than 10%, the Young's modulus is decreased. On the other hand, if the content is more than 19%, the liquidus temperature becomes high so that the devitrification resistance is degraded. The content of $Al_2O_3$ is preferably not smaller than 12% (more preferably not smaller than 14.5%) and not greater than 18.0%.

In the above-mentioned alkali-free glass, mullite or anorthite tends to be deposited as devitrifying crystals, together with cristobalite. The degree of deposition of mullite or anorthite is greatly affected by a mol ratio of the total mol number of alkaline earth metal oxides except MgO and the mol number of $Al_2O_3$, i.e., $(CaO+BaO+SrO)/Al_2O_3$. The mol ratio not greater than 0.8 is not favorable because the tendency of devitrification is increased and the formability is decreased. On the other hand, the mol ratio not smaller than 1.5 is not favorable because the density is increased. The mol ratio is more preferably within a range between 0.9 and 1.2.

$B_2O_3$ is a component acting as a melting agent to reduce the viscosity and to improve the meltability. If the content of $B_2O_3$ is smaller than 6.5%, the effect as the melting agent is insufficient and the BHF resistance is degraded. If the content is greater than 15%, the strain point of the glass is lowered so that the heat resistance is decreased. In addition, the acid resistance is degraded. Furthermore, the Young's modulus is lowered so that the specific modulus is reduced. The content of $B_2O_3$ is preferably not smaller than 7% (more preferably not smaller than 8.6%) and not greater than 14% (more preferably not greater than 12%).

MgO serves to reduce the high-temperature viscosity and to improve the meltability of the glass without lowering the strain point. Amongst the alkaline earth metal oxides, MgO is most effective in reducing the density. However, if the content of MgO is large, the liquidus temperature is elevated so that the devitrification resistance is degraded. In addition, MgO reacts with the BHF to produce a reaction product which may be attached to a device on the surface of the glass plate or adhered to the glass plate so that the glass plate is clouded. Therefore, the content must be limited. The content of MgO is 0–2%, preferably 0–1%, more preferably 0–0.5%. Furthermore, it is desired that MgO is not substantially contained.

Like MgO, CaO serves to reduce the high-temperature viscosity and to remarkably improve the meltability of the glass without lowering the strain point. The content of CaO is 3–12%. Generally, the alkali-free glass of the type is hardly melted. In order to supply a large amount of high-quality glass plates at a low cost, it is important to improve the meltability. The reduction in content of $SiO_2$ is most effective to improve the meltability. However, the reduction in content of $SiO_2$ is unfavorable because the acid resistance is extremely degraded and the density and the coefficient of thermal expansion of the glass are increased. Therefore, in order to improve the meltability, 3% or more CaO is contained.

If the content of CaO is less than 3%, the content of BaO and SrO must be increased so that the mol ratio of (CaO+BaO+SrO)/$Al_2O_3$ falls within a range between 0.8 and 1.5. However, such a large content of BaO and SrO is unfavorable because the density is considerably increased. On the other hand, more than 12% CaO is unfavorable because the BHF resistance of the glass is degraded. In this event, the surface of the glass plate is readily eroded and the reaction product is adhered to the surface of the glass plate so that the glass is clouded. In addition, the coefficient of thermal expansion becomes excessively high. The desired content of CaO is not smaller than 4% (more preferably not smaller than 5%) and not greater than 10% (more preferably not greater than 9%).

Each of BaO and SrO is a component improving the chemical resistance and the devitrification resistance of the glass. However, a large content of BaO and SrO results in an increase in density and in coefficient of thermal expansion of the glass. Therefore, the contents of BaO and SrO must be restricted to 0.1–5% and 0–4%, respectively. In case where the contents of BaO and SrO are reduced for the purpose of achieving the low density, the effect of improving the BHF resistance is decreased if the contents of BaO and SrO are extremely unbalanced. Therefore, it is desired to contain BaO and SrO so as to satisfy: (BaO+SrO)/BaO=1.1–10 (preferably, 1.2–5) in mass ratio. The desired content of BaO is not smaller than 0.3% (more preferably not smaller than 0.5%) and not greater than 2% (more preferably not greater than 1%). The content of SrO is preferably 0.1–2.7%, more preferably, 0.3–1.5%.

Each of BaO and SrO is a component having a characteristic of particularly improving the BHF resistance. Therefore, in order to improve the BHF resistance, it is necessary that the total content of these components is 0.1% or more (preferably 0.3% or more, more preferably 0.5% or more). However, if the content of BaO and SrO is excessive, the density and the coefficient of thermal expansion are increased as mentioned above. Therefore, the total content must be suppressed to 6% or less. Within the above-mentioned range, the total content of BaO and SrO is desirably as large as possible in view of the improvement of the BHF resistance. On the other hand, in view of the reduction in density and in coefficient of thermal expansion, the total content is desirably as small as possible.

ZnO is a component improving the BHF resistance and the meltability of the glass plate. However, a large content of ZnO is unfavorable because the glass tends to be devitrified, the strain point is lowered, and the density is increased. Therefore, the content of ZnO is 0–5%, preferably not greater than 3%, more preferably not greater than 0.9%, and most preferably not greater than 0.5%.

By containing the mixture of the components MgO, CaO, BaO, SrO, and ZnO, the liquidus temperature of the glass is remarkably lowered and devitrification stones are hardly produced. Thus, the meltability and the formability of the glass are improved. However, if the total content of MgO, CaO, BaO, SrO, and ZnO is smaller than 5%, the effect as the melting agent is insufficient so that the meltability is degraded. In addition, the coefficient of thermal expansion is excessively lowered and fails to match with that of the TFT material. On the other hand, the total content more than 15% is unfavorable because the density is increased so that the reduction in weight of the glass plate can not be achieved. In addition, the specific modulus is decreased. The total content of MgO, CaO, BaO, SrO, and ZnO is preferably 5–12%, more preferably 5–10%.

$ZrO_2$ is a component improving the chemical resistance, particularly, the acid resistance of the glass and increasing the Young's modulus. However, the content more than 5% is unfavorable because the liquidus temperature is elevated and the devitrification stones of zircon tend to be produced. The content of $ZrO_2$ is preferably 0–3%, more preferably 0–1%.

$TiO_2$ is a component improving the chemical resistance, particularly, the acid resistance of the glass and reducing the high-temperature viscosity to improve the meltability. However, a large content is unfavorable as a glass plate for a display because the glass is colored so that the transmittance is decreased. Therefore, the content of $TiO_2$ must be limited to 0–5%, preferably 0–3%, more preferably 0–1%.

$P_2O_5$ is a component improving the devitrification resistance of the glass. However, a large content is unfavorable because phase separation and opaque are caused in the glass and the acid resistance is remarkably deteriorated. Therefore, the content of $P_2O_5$ must be limited to 0–5%, preferably 0–3%, more preferably 0–1%.

In addition to the above-mentioned components, $Y_2O_3$, $Nb_2O_3$, and $La_2O_3$ may be contained up to about 5%. These components serve to achieve a high strain point and a high Young's modulus. However, a large content is unfavorable because the density is increased.

Furthermore, as far as the characteristics of the glass are not deteriorated, a fining agent such as $As_2O_3$, $Sb_2O_3$, $Sb_2O_5$, $F_2$, $Cl_2$, $SO_3$, C, or metal powder of Al or Si may be contained up to 5%. As a fining agent, $CeO_2$, $SnO_2$, or $Fe_2O_3$ may also be contained up to 5%.

In case where the alkali-free glass is melted, $As_2O_3$ acting as the fining agent at a high temperature has been used. Recently, however, it is considered unfavorable to use an environmental load chemical substance, such as $As_2O_3$. Like $As_2O_3$, $SnO_2$ has a fining ability at a high temperature and is very effective as a fining agent for melting the alkali-free glass. However, a large content of $SnO_2$ causes the glass to be devitrified. Therefore, the content is limited to 5% or less, preferably 2% or less.

Cl has an effect of promoting the melting of the alkali-free glass. By the addition of Cl, the glass is melted at a low temperature. Therefore, the fining agent more effectively works. Furthermore, the cost of melting the glass is lowered and the life of the production facility is prolonged. However, an excessive content of Cl lowers the strain point of the glass. Therefore, the content is desirably limited to 3% or less. As a raw material of the Cl component, use may be made of chloride of alkaline earth metal oxide, for example, barium chloride, or a material such as aluminum chloride.

As the fining agent for the above-mentioned alkali-free glass, $Sb_2O_3$ or $Sb_2O_5$ is also effective. However, since the alkali-free glass has a high melting temperature, the effect of $Sb_2O_3$ or $Sb_2O_5$ as the fining agent is small as compared with $As_2O_3$. Therefore, in case where the $Sb_2O_3$ or $Sb_2O_5$ is used, it is desired to increase the content or to combine the component, such as Cl, for promoting the meltability so that the melting temperature is lowered. However, if the content of $Sb_2O_3$ or $Sb_2O_5$ is greater than 5%, the density is increased. Therefore, the content is preferably limited to 2% or less, more preferably 1.5% or less.

In case where $As_2O_3$ is not used as the fining agent, it is preferable to contain at least one selected from a group comprising $Sb_2O_3$, $Sb_2O_5$, $SnO_2$, and Cl at a content of 0.5–3.0%. In particular, it is most preferable to contain 0.05–2.0% $Sb_2O_3+Sb_2O_5$, 0.01–1.0% $SnO_2$, and 0.005–1.0% Cl.

Now, description will be made in detail in conjunction with specific examples.

In Tables 1–17, samples Nos. 1–46 are specific examples of the above-mentioned alkali-free glass. Samples Nos. 47–49 are comparative examples. A sample No. 49 is the 1737 glass manufactured by Corning Incorporated.

TABLE 1

| | Sample No. 1 | | Sample No. 2 | | Sample No. 3 | |
|---|---|---|---|---|---|---|
| | mass % | mol % | mass % | mol % | mass % | mol % |
| $SiO_2$ | 61.2 | 67.5 | 62.1 | 68.4 | 61.7 | 67.9 |
| $Al_2O_3$ | 16.8 | 10.9 | 16.3 | 10.6 | 16.3 | 10.6 |
| $B_2O_3$ | 11.8 | 11.3 | 11.4 | 10.8 | 11.8 | 11.3 |
| MgO | — | — | — | — | — | — |
| CaO | 7.9 | 9.3 | 7.9 | 9.3 | 7.9 | 9.3 |
| SrO | 0.5 | 0.3 | 0.5 | 0.3 | 0.5 | 0.3 |
| BaO | 0.5 | 0.2 | 0.5 | 0.2 | 0.5 | 0.2 |
| ZnO | — | — | — | — | — | — |
| $P_2O_5$ | — | — | — | — | — | — |
| $As_2O_3$ | — | — | — | — | — | — |
| $SnO_2$ | — | — | — | — | — | — |
| $Sb_2O_3$ | 1.0 | 0.2 | 1.0 | 0.2 | 1.0 | 0.2 |
| $ZrO_2$ | 0.3 | 0.2 | 0.3 | 0.2 | 0.3 | 0.2 |
| Cl | — | — | — | — | — | — |
| (BaO + SrO)/BaO | 2 | | 2 | | 2 | |
| density (g/cm³) | 2.384 | | 2.383 | | 2.382 | |
| coefficient of thermal expansion [30–380° C.] (×10⁻⁷/° C.) temperature (° C.) | 33 | | 33 | | 33 | |
| strain point | 667 | | 668 | | 665 | |
| annealing point | 724 | | 725 | | 722 | |
| softening point | 973 | | 977 | | 971 | |
| at viscosity | | | | | | |
| $10^{4.0}$ | 1301 | | 1316 | | 1305 | |
| $10^{3.0}$ | 1467 | | 1485 | | 1474 | |
| $10^{2.5}$ | 1573 | | 1594 | | 1581 | |
| Young's modulus (GPa) | 69 | | 69 | | 69 | |
| specific modulus (GPa/(g · cm⁻³)) | 29.1 | | 29.1 | | 28.8 | |
| erosion as BHF resistance (μm) | 0.6 | | 0.6 | | 0.6 | |
| evaluation of appearance | ○ | | ○ | | ○ | |
| erosion as HCl resistance (μm) | 7.3 | | 6.0 | | 7.2 | |
| evaluation of appearance | ○ | | ○ | | ○ | |
| liquidus temperature (° C.) | 1123 | | 1092 | | 1094 | |
| liquidus viscosity (dPa · s) | $10^{5.6}$ | | $10^{6.1}$ | | $10^{5.9}$ | |

TABLE 2

| | Sample No. 4 | | Sample No. 5 | | Sample No. 6 | |
|---|---|---|---|---|---|---|
| | mass % | mol % | mass % | mol % | mass % | mol % |
| $SiO_2$ | 61.2 | 67.4 | 61.2 | 67.2 | 61.7 | 68.2 |
| $Al_2O_3$ | 16.8 | 10.9 | 16.8 | 10.9 | 17.0 | 11.1 |
| $B_2O_3$ | 11.8 | 11.3 | 11.8 | 11.2 | 10.5 | 10.0 |
| MgO | 0.5 | 0.8 | 1.0 | 1.6 | — | — |
| CaO | 7.4 | 8.7 | 6.9 | 9.3 | 8.0 | 9.5 |
| SrO | 0.5 | 0.3 | 0.5 | 0.3 | 1.0 | 0.6 |
| BaO | 0.5 | 0.2 | 0.5 | 0.2 | 0.5 | 0.2 |
| ZnO | — | — | — | — | — | — |
| $P_2O_5$ | — | — | — | — | — | — |
| $As_2O_3$ | — | — | — | — | — | — |
| $SnO_2$ | — | — | — | — | — | — |
| $Sb_2O_3$ | 1.0 | 0.2 | 1.0 | 0.2 | 1.0 | 0.2 |
| $ZrO_2$ | 0.3 | 0.2 | 0.3 | 0.2 | 0.3 | 0.2 |
| Cl | — | — | — | — | — | — |
| (BaO + SrO)/BaO | 2 | | 2 | | 3 | |
| density (g/cm³) | 2.382 | | 2.379 | | 2.400 | |
| coefficient of thermal expansion [30–380° C.] (×10⁻⁷/° C.) temperature (° C.) | 33 | | 32 | | 34 | |
| strain point | 669 | | 670 | | 674 | |
| annealing point | 724 | | 724 | | 731 | |
| softening point | 973 | | 973 | | 984 | |
| at viscosity | | | | | | |
| $10^{4.0}$ | 1301 | | 1301 | | 1322 | |
| $10^{3.0}$ | 1467 | | 1467 | | 1488 | |
| $10^{2.5}$ | 1573 | | 1573 | | 1597 | |
| Young's modulus (GPa) | 70 | | 70 | | 71 | |
| specific modulus (GPa/(g · cm⁻³)) | 29.3 | | 29.5 | | 29.4 | |
| erosion as BHF resistance (μm) | 0.6 | | 0.6 | | 0.6 | |
| evaluation of appearance | ○ | | ○ | | ○ | |
| erosion as HCl resistance (μm) | 7.3 | | 7.3 | | 4.6 | |
| evaluation of appearance | ○ | | ○ | | ○ | |
| liquidus temperature (° C.) | 1128 | | 1146 | | 1094 | |
| liquidus viscosity (dPa · s) | $10^{5.6}$ | | $10^{5.4}$ | | $10^{6.1}$ | |

TABLE 3

| | Sample No. 7 | | Sample No. 8 | | Sample No. 9 | |
|---|---|---|---|---|---|---|
| | mass % | mol % | mass % | mol % | mass % | mol % |
| $SiO_2$ | 63.5 | 67.3 | 61.8 | 68.3 | 62.8 | 69.2 |
| $Al_2O_3$ | 16.5 | 10.6 | 17.0 | 11.1 | 16.5 | 10.7 |
| $B_2O_3$ | 10.5 | 9.9 | 10.5 | 10.0 | 10.0 | 9.5 |
| MgO | — | — | — | — | — | — |
| CaO | 8.0 | 9.4 | 8.0 | 9.5 | 8.0 | 9.5 |
| SrO | 1.0 | 0.6 | 0.5 | 0.3 | 0.5 | 0.3 |
| BaO | 0.5 | 0.2 | 0.6 | 0.3 | 0.6 | 0.3 |
| ZnO | — | — | — | — | — | — |
| $P_2O_5$ | — | — | — | — | — | — |
| $As_2O_3$ | — | — | — | — | — | — |
| $SnO_2$ | — | — | 0.3 | 0.1 | 0.3 | 0.1 |
| $Sb_2O_3$ | — | — | 1.0 | 0.2 | 1.0 | 0.2 |
| $ZrO_2$ | — | — | 0.3 | 0.2 | 0.3 | 0.2 |
| Cl | — | — | — | — | — | — |
| (BaO + SrO)/BaO | 3 | | 1.8 | | 1.8 | |
| density (g/cm³) | 2.375 | | 2.395 | | 2.393 | |

TABLE 3-continued

| | Sample No. 7 | | Sample No. 8 | | Sample No. 9 | |
|---|---|---|---|---|---|---|
| | mass % | mol % | mass % | mol % | mass % | mol % |
| coefficient of thermal expansion [30–380° C.] (×10⁻⁷/° C.) temperature (° C.) | 33 | | 33 | | 33 | |
| strain point | 675 | | 675 | | 676 | |
| annealing point | 734 | | 733 | | 734 | |
| softening point at viscosity | 991 | | 989 | | 993 | |
| $10^{4.0}$ | 1353 | | 1332 | | 1347 | |
| $10^{3.0}$ | 1527 | | 1499 | | 1517 | |
| $10^{2.5}$ | 1641 | | 1610 | | 1631 | |
| Young's modulus (GPa) | 69 | | 70 | | 70 | |
| specific modulus (GPa/(g · cm⁻³)) | 29.2 | | 29.4 | | 29.2 | |
| erosion as BHF resistance (μm) | 0.6 | | 0.6 | | 0.6 | |
| evaluation of appearance | ○ | | ○ | | ○ | |
| erosion as HCl resistance (μm) | 4.6 | | 4.6 | | 4.2 | |
| evaluation of appearance | ○ | | ○ | | ○ | |
| liquidus temperature (° C.) | 1065 | | 1118 | | 1085 | |
| liquidus viscosity (dPa · s) | $10^{6.6}$ | | $10^{5.9}$ | | $10^{6.4}$ | |

TABLE 4

| | Sample No. 10 | | Sample No. 11 | | Sample No. 12 | |
|---|---|---|---|---|---|---|
| | mass % | mol % | mass % | mol % | mass % | mol % |
| $SiO_2$ | 61.8 | 68.8 | 60.8 | 67.7 | 61.8 | 68.7 |
| $Al_2O_3$ | 17.0 | 11.2 | 17.0 | 11.1 | 17.0 | 11.1 |
| $B_2O_3$ | 10.5 | 10.1 | 10.5 | 10.1 | 9.5 | 9.1 |
| MgO | — | — | — | — | — | — |
| CaO | 7.0 | 8.4 | 8.0 | 9.5 | 8.0 | 9.5 |
| SrO | 0.5 | 0.3 | 0.5 | 0.3 | 0.5 | 0.3 |
| BaO | 0.6 | 0.3 | 0.6 | 0.3 | 0.6 | 0.3 |
| ZnO | — | — | — | — | — | — |
| $P_2O_5$ | 1.0 | 0.5 | 1.0 | 0.5 | 1.0 | 0.5 |
| $As_2O_3$ | — | — | — | — | — | — |
| $SnO_2$ | 0.3 | 0.1 | 0.3 | 0.1 | 0.3 | 0.1 |
| $Sb_2O_3$ | 1.0 | 0.2 | 1.0 | 0.2 | 1.0 | 0.2 |
| $ZrO_2$ | 0.3 | 0.2 | 0.3 | 0.2 | 0.3 | 0.2 |
| Cl | — | — | — | — | — | — |
| (BaO + SrO)/BaO | 1.8 | | 1.8 | | 1.8 | |
| density (g/cm³) | 2.374 | | 2.395 | | 2.397 | |
| coefficient of thermal expansion [30–380° C.] (×10⁻⁷/° C.) temperature (° C.) | 31 | | 33 | | 33 | |
| strain point | 680 | | 675 | | 681 | |
| annealing point | 739 | | 733 | | 739 | |
| softening point at viscosity | 1007 | | 989 | | 1000 | |
| $10^{4.0}$ | 1362 | | 1332 | | 1354 | |
| $10^{3.0}$ | 1534 | | 1499 | | 1522 | |
| $10^{2.5}$ | 1647 | | 1610 | | 1636 | |
| Young's modulus (GPa) | 69 | | 70 | | 71 | |
| specific modulus (GPa/(g · cm⁻³)) | 29.2 | | 29.4 | | 29.6 | |

TABLE 4-continued

| | Sample No. 10 | | Sample No. 11 | | Sample No. 12 | |
|---|---|---|---|---|---|---|
| | mass % | mol % | mass % | mol % | mass % | mol % |
| erosion as BHF resistance (μm) | 0.6 | | 0.6 | | 0.6 | |
| evaluation of appearance | ○ | | ○ | | ○ | |
| erosion as HCl resistance (μm) | 4.6 | | 4.6 | | 3.5 | |
| evaluation of appearance | ○ | | ○ | | ○ | |
| liquidus temperature (° C.) | 1124 | | 1118 | | 1122 | |
| liquidus viscosity (dPa · s) | $10^{6.1}$ | | $10^{5.9}$ | | $10^{6.0}$ | |

TABLE 5

| | Sample No. 13 | | Sample No. 14 | | Sample No. 15 | |
|---|---|---|---|---|---|---|
| | mass % | mol % | mass % | mol % | mass % | mol % |
| $SiO_2$ | 61.8 | 68.2 | 61.8 | 68.0 | 63.0 | 69.0 |
| $Al_2O_3$ | 17.0 | 11.1 | 17.0 | 11.0 | 17.0 | 11.0 |
| $B_2O_3$ | 10.5 | 10.0 | 10.5 | 10.0 | 10.0 | 9.5 |
| MgO | 0.5 | 0.8 | 1.0 | 1.6 | — | — |
| CaO | 7.5 | 8.9 | 7.0 | 8.3 | 8.0 | 9.4 |
| SrO | 0.5 | 0.3 | 0.5 | 0.3 | 1.3 | 0.8 |
| BaO | 0.6 | 0.3 | 0.6 | 0.3 | 0.7 | 0.3 |
| ZnO | — | — | — | — | — | — |
| $P_2O_5$ | — | — | — | — | — | — |
| $As_2O_3$ | — | — | — | — | — | — |
| $SnO_2$ | 0.3 | 0.1 | 0.3 | 0.1 | — | — |
| $Sb_2O_3$ | 1.0 | 0.2 | 1.0 | 0.2 | — | — |
| $ZrO_2$ | 0.3 | 0.2 | 0.3 | 0.2 | — | — |
| Cl | — | — | — | — | — | — |
| (BaO + SrO)/BaO | 1.8 | | 1.8 | | 2.9 | |
| density (g/cm³) | 2.392 | | 2.389 | | 2.390 | |
| coefficient of thermal expansion [30–380° C.] (×10⁻⁷/° C.) temperature (° C.) | 32 | | 32 | | 34 | |
| strain point | 677 | | 678 | | 678 | |
| annealing point | 733 | | 733 | | 737 | |
| softening point at viscosity | 989 | | 989 | | 993 | |
| $10^{4.0}$ | 1332 | | 1332 | | 1349 | |
| $10^{3.0}$ | 1499 | | 1499 | | 1520 | |
| $10^{2.5}$ | 1610 | | 1610 | | 1632 | |
| Young's modulus (GPa) | 71 | | 71 | | 71 | |
| specific modulus (GPa/(g · cm⁻³)) | 29.5 | | 29.7 | | 29.6 | |
| erosion as BHF resistance (μm) | 0.7 | | 0.8 | | 0.6 | |
| evaluation of appearance | ○ | | ○ | | ○ | |
| erosion as HCl resistance (μm) | 4.6 | | 4.6 | | 3.0 | |
| evaluation of appearance | ○ | | ○ | | ○ | |
| liquidus temperature (° C.) | 1133 | | 1148 | | 1066 | |
| liquidus viscosity (dPa · s) | $10^{5.7}$ | | $10^{5.5}$ | | $10^{6.6}$ | |

TABLE 6

|  | Sample No. 16 | | Sample No. 17 | | Sample No. 18 | |
| --- | --- | --- | --- | --- | --- | --- |
|  | mass % | mol % | mass % | mol % | mass % | mol % |
| SiO$_2$ | 63.1 | 69.5 | 62.6 | 69.1 | 62.5 | 69.1 |
| Al$_2$O$_3$ | 17.9 | 11.6 | 17.9 | 11.7 | 17.5 | 11.4 |
| B$_2$O$_3$ | 9.5 | 9.0 | 9.5 | 9.1 | 9.5 | 9.1 |
| MgO | — | — | — | — | — | — |
| CaO | 7.8 | 9.2 | 7.8 | 9.2 | 7.8 | 9.3 |
| SrO | 0.2 | 0.1 | 0.5 | 0.3 | 0.5 | 0.3 |
| BaO | 0.8 | 0.4 | 1.0 | 0.4 | 1.5 | 0.7 |
| ZnO | — | — | — | — | — | — |
| P$_2$O$_5$ | — | — | — | — | — | — |
| As$_2$O$_3$ | — | — | — | — | — | — |
| SnO$_2$ | — | — | — | — | — | — |
| Sb$_2$O$_3$ | 0.7 | 0.2 | 0.7 | 0.2 | 0.7 | 0.2 |
| ZrO$_2$ | — | — | — | — | — | — |
| Cl | — | — | — | — | — | — |
| (BaO + SrO)/BaO | 1.3 | | 1.5 | | 1.3 | |
| density (g/cm$^3$) | 2.381 | | 2.392 | | 2.402 | |
| coefficient of thermal expansion [30–380° C.] (×10$^{-7}$/° C.) temperature (° C.) | 32 | | 33 | | 33 | |
| strain point | 686 | | 685 | | 681 | |
| annealing point | 745 | | 743 | | 739 | |
| softening point at viscosity | 1011 | | 1006 | | 1001 | |
| 10$^{4.0}$ | 1368 | | 1357 | | 1350 | |
| 10$^{3.0}$ | 1537 | | 1526 | | 1522 | |
| 10$^{2.5}$ | 1650 | | 1637 | | 1633 | |
| Young's modulus (GPa) | 71 | | 72 | | 71 | |
| specific modulus (GPa/(g · cm$^{-3}$)) | 29.9 | | 29.9 | | 29.7 | |
| erosion as BHF resistance (μm) | 0.6 | | 0.6 | | 0.6 | |
| evaluation of appearance | ○ | | ○ | | ○ | |
| erosion as HCl resistance (μm) | 3.6 | | 3.6 | | 3.7 | |
| evaluation of appearance | ○ | | ○ | | ○ | |
| liquidus temperature (° C.) | 1146 | | 1149 | | 1123 | |
| liquidus viscosity (dPa · s) | 10$^{5.9}$ | | 10$^{5.8}$ | | 10$^{6.0}$ | |

TABLE 7

|  | Sample No. 19 | | Sample No. 20 | | Sample No. 21 | |
| --- | --- | --- | --- | --- | --- | --- |
|  | mass % | mol % | mass % | mol % | mass % | mol % |
| SiO$_2$ | 62.9 | 69.2 | 63.0 | 69.4 | 62.6 | 69.2 |
| Al$_2$O$_3$ | 17.0 | 11.0 | 17.5 | 11.4 | 16.0 | 10.4 |
| B$_2$O$_3$ | 9.9 | 9.4 | 9.9 | 9.4 | 10.3 | 9.8 |
| MgO | — | — | — | — | — | — |
| CaO | 7.8 | 9.2 | 7.8 | 9.2 | 7.8 | 9.2 |
| SrO | 1.0 | 0.6 | 0.2 | 0.1 | 1.0 | 0.6 |
| BaO | 1.0 | 0.4 | 0.4 | 0.2 | 0.6 | 0.3 |
| ZnO | — | — | — | — | — | — |
| P$_2$O$_5$ | — | — | — | — | — | — |
| As$_2$O$_3$ | — | — | — | — | — | — |
| SnO$_2$ | — | — | — | — | — | — |
| Sb$_2$O$_3$ | 0.3 | 0.1 | 1.0 | 0.2 | 1.5 | 0.3 |
| ZrO$_2$ | 0.1 | 0.1 | 0.2 | 0.1 | 0.2 | 0.1 |
| Cl | — | — | — | — | — | — |
| (BaO + SrO)/BaO | 2 | | 1.5 | | 2.7 | |
| density (g/cm$^3$) | 2.393 | | 2.377 | | 2.399 | |
| coefficient of thermal expansion [30–380° C.] (×10$^{-7}$/° C.) temperature (° C.) | 33 | | 32 | | 33 | |
| strain point | 679 | | 683 | | 670 | |
| annealing point | 737 | | 742 | | 727 | |
| softening point at viscosity | 996 | | 1006 | | 982 | |
| 10$^{4.0}$ | 1350 | | 1360 | | 1331 | |
| 10$^{3.0}$ | 1522 | | 1528 | | 1503 | |
| 10$^{2.5}$ | 1634 | | 1641 | | 1615 | |
| Young's modulus (GPa) | 71 | | 71 | | 69 | |
| specific modulus (GPa/(g · cm$^{-3}$)) | 29.6 | | 29.7 | | 28.8 | |
| erosion as BHF resistance (μm) | 0.6 | | 0.6 | | 0.6 | |
| evaluation of appearance | ○ | | ○ | | ○ | |
| erosion as HCl resistance (μm) | 3.8 | | 3.8 | | 4.5 | |
| evaluation of appearance | ○ | | ○ | | ○ | |
| liquidus temperature (° C.) | 1092 | | 1149 | | 1058 | |
| liquidus viscosity (dPa · s) | 10$^{6.3}$ | | 10$^{5.8}$ | | 10$^{6.6}$ | |

TABLE 8

|  | Sample No. 22 | | Sample No. 23 | | Sample No. 24 | |
| --- | --- | --- | --- | --- | --- | --- |
|  | mass % | mol % | mass % | mol % | mass % | mol % |
| SiO$_2$ | 63.8 | 69.8 | 63.7 | 69.9 | 65.3 | 70.7 |
| Al$_2$O$_3$ | 15.1 | 9.7 | 15.1 | 9.8 | 14.6 | 9.3 |
| B$_2$O$_3$ | 10.3 | 9.7 | 10.3 | 9.8 | 9.4 | 8.8 |
| MgO | — | — | — | — | — | — |
| CaO | 7.8 | 9.2 | 7.8 | 9.2 | 9.0 | 10.5 |
| SrO | 1.1 | 0.7 | 1.1 | 0.7 | 0.5 | 0.3 |
| BaO | 0.7 | 0.3 | 0.7 | 0.3 | 0.5 | 0.2 |
| ZnO | 0.4 | 0.3 | — | — | — | — |
| P$_2$O$_5$ | — | — | 0.5 | 0.2 | — | — |
| As$_2$O$_3$ | — | — | — | — | — | — |
| SnO$_2$ | 0.1 | <0.05 | 0.1 | <0.05 | — | — |
| Sb$_2$O$_3$ | 0.7 | 0.2 | 0.7 | 0.2 | 0.7 | 0.2 |
| ZrO$_2$ | — | — | — | — | — | — |
| Cl | — | — | — | — | — | — |
| (BaO + SrO)/BaO | 2.6 | | 2.6 | | 2 | |
| density (g/cm$^3$) | 2.393 | | 2.384 | | 2.389 | |
| coefficient of thermal expansion [30–380° C.] (×10$^{-7}$/° C.) temperature (° C.) | 33 | | 33 | | 34 | |
| strain point | 666 | | 668 | | 667 | |
| annealing point | 723 | | 726 | | 726 | |
| softening point at viscosity | 978 | | 984 | | 980 | |
| 10$^{4.0}$ | 1342 | | 1354 | | 1359 | |
| 10$^{3.0}$ | 1519 | | 1534 | | 1539 | |
| 10$^{2.5}$ | 1634 | | 1650 | | 1650 | |
| Young's modulus (GPa) | 68 | | 68 | | 68 | |
| specific modulus | 28.3 | | 28.4 | | 28.5 | |

TABLE 8-continued

|  | Sample No. 22 | | Sample No. 23 | | Sample No. 24 | |
| --- | --- | --- | --- | --- | --- | --- |
|  | mass % | mol % | mass % | mol % | mass % | mol % |
| (GPa/(g · cm$^{-3}$)) | | | | | | |
| erosion as BHF resistance (μm) | 0.5 | | 0.6 | | 0.6 | |
| evaluation of appearance | ○ | | ○ | | ○ | |
| erosion as HCl resistance (μm) | 4.5 | | 4.5 | | 3.4 | |
| evaluation of appearance | ○ | | ○ | | ○ | |
| liquidus temperature (° C.) | 1055 | | 1055 | | 1054 | |
| liquidus viscosity (dPa · s) | 10$^{6.6}$ | | 10$^{6.7}$ | | 10$^{6.7}$ | |

TABLE 9

|  | Sample No. 25 | | Sample No. 26 | | Sample No. 27 | |
| --- | --- | --- | --- | --- | --- | --- |
|  | mass % | mol % | mass % | mol % | mass % | mol % |
| SiO$_2$ | 63.3 | 69.5 | 64.0 | 69.6 | 63.6 | 69.9 |
| Al$_2$O$_3$ | 15.0 | 9.7 | 15.0 | 9.6 | 15.8 | 10.2 |
| B$_2$O$_3$ | 12.0 | 11.4 | 10.0 | 9.4 | 10.3 | 9.7 |
| MgO | — | — | — | — | — | — |
| CaO | 7.0 | 8.2 | 10.0 | 11.6 | 7.6 | 9.0 |
| SrO | 1.0 | 0.7 | 0.5 | 0.3 | 1.0 | 0.6 |
| BaO | 1.0 | 0.4 | 0.5 | 0.2 | 0.5 | 0.2 |
| ZnO | — | — | — | — | — | — |
| P$_2$O$_5$ | — | — | — | — | — | — |
| As$_2$O$_3$ | — | — | — | — | — | — |
| SnO$_2$ | — | — | — | — | 0.1 | <0.05 |
| Sb$_2$O$_3$ | 0.7 | 0.2 | — | — | 1.0 | 0.2 |
| ZrO$_2$ | — | — | — | — | 0.1 | 0.1 |
| Cl | — | — | — | — | — | — |
| (BaO + SrO)/BaO | 2 | | 2 | | 3 | |
| density (g/cm$^3$) | 2.365 | | 2.399 | | 2.386 | |
| coefficient of thermal expansion [30–380° C.] (×10$^{-7}$/° C.) | 32 | | 36 | | 33 | |
| temperature (° C.) | | | | | | |
| strain point | 661 | | 664 | | 671 | |
| annealing point | 720 | | 720 | | 730 | |
| softening point | 977 | | 961 | | 988 | |
| at viscosity | | | | | | |
| 10$^{4.0}$ | 1339 | | 1326 | | 1346 | |
| 10$^{3.0}$ | 1521 | | 1502 | | 1520 | |
| 10$^{2.5}$ | 1635 | | 1619 | | 1634 | |
| Young's modulus (GPa) | 66 | | 69 | | 69 | |
| specific modulus (GPa/(g · cm$^{-3}$)) | 27.9 | | 28.7 | | 28.8 | |
| erosion as BHF resistance (μm) | 0.6 | | 0.6 | | 0.6 | |
| evaluation of appearance | ○ | | ○ | | ○ | |
| erosion as HCl resistance (μm) | 7.1 | | 4.1 | | 4.5 | |
| evaluation of appearance | ○ | | ○ | | ○ | |
| liquidus temperature (° C.) | 1060 | | 1050 | | 1102 | |
| liquidus viscosity (dPa · s) | 10$^{6.5}$ | | 10$^{6.4}$ | | 10$^{6.1}$ | |

TABLE 10

|  | Sample No. 28 | | Sample No. 29 | | Sample No. 30 | |
| --- | --- | --- | --- | --- | --- | --- |
|  | mass % | mol % | mass % | mol % | mass % | mol % |
| SiO$_2$ | 63.3 | 69.7 | 63.1 | 69.5 | 63.1 | 69.4 |
| Al$_2$O$_3$ | 16.1 | 10.4 | 16.3 | 10.6 | 16.1 | 10.4 |
| B$_2$O$_3$ | 10.3 | 9.8 | 10.3 | 9.8 | 10.3 | 9.7 |
| MgO | — | — | — | — | — | — |
| CaO | 7.6 | 9.0 | 7.6 | 9.0 | 7.8 | 9.2 |
| SrO | 1.0 | 0.6 | 1.0 | 0.6 | 0.5 | 0.3 |
| BaO | 0.5 | 0.2 | 0.5 | 0.2 | 0.5 | 0.2 |
| ZnO | — | — | — | — | 0.5 | 0.4 |
| P$_2$O$_5$ | — | — | — | — | — | — |
| As$_2$O$_3$ | — | — | — | — | — | — |
| SnO$_2$ | 0.1 | <0.05 | 0.1 | <0.05 | 0.1 | <0.05 |
| Sb$_2$O$_3$ | 1.0 | 0.2 | 1.0 | 0.2 | 1.0 | 0.2 |
| ZrO$_2$ | 0.1 | 0.1 | 0.1 | 0.1 | 0.1 | 0.1 |
| Cl | — | — | — | — | — | — |
| (BaO + SrO)/BaO | 3 | | 3 | | 2 | |
| density (g/cm$^3$) | 2.388 | | 2.389 | | 2.392 | |
| coefficient of thermal expansion [30–380° C.] (×10$^{-7}$/° C.) | 33 | | 33 | | 33 | |
| temperature (° C.) | | | | | | |
| strain point | 673 | | 674 | | 671 | |
| annealing point | 731 | | 732 | | 728 | |
| softening point | 989 | | 990 | | 984 | |
| at viscosity | | | | | | |
| 10$^{4.0}$ | 1344 | | 1342 | | 1334 | |
| 10$^{3.0}$ | 1516 | | 1514 | | 1504 | |
| 10$^{2.5}$ | 1629 | | 1626 | | 1615 | |
| Young's modulus (GPa) | 69 | | 69 | | 69 | |
| specific modulus (GPa/(g · cm$^{-3}$)) | 28.9 | | 29.0 | | 28.8 | |
| erosion as BHF resistance (μm) | 0.6 | | 0.6 | | 0.5 | |
| evaluation of appearance | ○ | | ○ | | ○ | |
| erosion as HCl resistance (μm) | 4.5 | | 4.5 | | 4.5 | |
| evaluation of appearance | ○ | | ○ | | ○ | |
| liquidus temperature (° C.) | 1103 | | 1104 | | 1091 | |
| liquidus viscosity (dPa · s) | 10$^{6.1}$ | | 10$^{6.3}$ | | 10$^{6.2}$ | |

TABLE 11

|  | Sample No. 31 | | Sample No. 32 | | Sample No. 33 | |
| --- | --- | --- | --- | --- | --- | --- |
|  | mass % | mol % | mass % | mol % | mass % | mol % |
| $SiO_2$ | 63.4 | 69.6 | 62.9 | 69.2 | 63.8 | 69.9 |
| $Al_2O_3$ | 15.8 | 10.2 | 16.3 | 10.6 | 15.8 | 10.2 |
| $B_2O_3$ | 10.3 | 9.7 | 10.3 | 9.8 | 10.3 | 9.7 |
| MgO | — | — | — | — | — | — |
| CaO | 7.8 | 9.2 | 7.8 | 9.2 | 7.9 | 9.3 |
| SrO | 0.5 | 0.3 | 0.5 | 0.3 | 0.5 | 0.3 |
| BaO | 0.5 | 0.2 | 0.5 | 0.2 | 0.5 | 0.2 |
| ZnO | 0.5 | 0.4 | 0.5 | 0.4 | — | — |
| $P_2O_5$ | — | — | — | — | — | — |
| $As_2O_3$ | — | — | — | — | — | — |
| $SnO_2$ | 0.1 | <0.05 | 0.1 | <0.05 | 0.1 | <0.05 |
| $Sb_2O_3$ | 1.0 | 0.2 | 1.0 | 0.2 | 1.0 | 0.2 |
| $ZrO_2$ | 0.1 | 0.1 | 0.1 | 0.1 | 0.1 | 0.1 |
| Cl | — | — | — | — | — | — |
| (BaO+SrO)/BaO | 2 | | 2 | | 2 | |
| density (g/cm$^3$) | 2.390 | | 2.393 | | 2.381 | |
| coefficient of thermal expansion [30–38° C.] ($\times 10^{-7}/°$ C.) temperature (° C.) | 33 | | 33 | | 33 | |
| strain point | 670 | | 672 | | 671 | |
| annealing point | 726 | | 726 | | 730 | |
| softening point | 983 | | 984 | | 988 | |
| at viscosity $10^{4.0}$ | 1336 | | 1332 | | 1349 | |
| at viscosity $10^{3.0}$ | 1507 | | 1501 | | 1523 | |
| at viscosity $10^{2.5}$ | 1620 | | 1611 | | 1638 | |
| Young's modulus (GPa) | 68 | | 69 | | 69 | |
| specific modulus (GPa/(g cm$^{-3}$)) | 28.7 | | 28.9 | | 28.8 | |
| erosion as BHF resistance (μm) | 0.5 | | 0.5 | | 0.6 | |
| evaluation of appearance | ○ | | ○ | | ○ | |
| erosion as HCl resistance (μm) | 4.5 | | 4.5 | | 4.5 | |
| evaluation of appearance | ○ | | ○ | | ○ | |
| liquidus temperature (° C.) | 1088 | | 1112 | | 1063 | |
| liquidus viscosity (dPa · s) | $10^{6.2}$ | | $10^{6.0}$ | | $10^{6.6}$ | |

TABLE 12

|  | Sample No. 34 | | Sample No. 35 | | Sample No. 36 | |
| --- | --- | --- | --- | --- | --- | --- |
|  | mass % | mol % | mass % | mol % | mass % | mol % |
| $SiO_2$ | 63.5 | 69.7 | 63.3 | 69.6 | 63.2 | 69.5 |
| $Al_2O_3$ | 16.1 | 10.4 | 16.3 | 10.6 | 15.9 | 10.3 |
| $B_2O_3$ | 10.3 | 9.7 | 10.3 | 9.7 | 10.4 | 9.9 |
| MgO | — | — | — | — | — | — |
| CaO | 7.9 | 9.3 | 7.9 | 9.3 | 7.6 | 9.0 |
| SrO | 0.5 | 0.3 | 0.5 | 0.3 | 1.0 | 0.7 |
| BaO | 0.5 | 0.2 | 0.5 | 0.2 | 0.5 | 0.2 |
| ZnO | — | — | — | — | — | — |
| $P_2O_5$ | — | — | — | — | — | — |
| $As_2O_3$ | — | — | — | — | 0.7 | 0.2 |
| $SnO_2$ | 0.1 | <0.05 | 0.1 | <0.05 | — | — |
| $Sb_2O_3$ | 1.0 | 0.2 | 1.0 | 0.2 | 0.5 | 0.1 |
| $ZrO_2$ | 0.1 | 0.1 | 0.1 | 0.1 | 0.1 | 0.1 |
| Cl | — | — | — | — | 0.1 | 0.2 |
| (BaO+SrO)/BaO | 2 | | 2 | | 3 | |
| density (g/cm$^3$) | 2.382 | | 2.384 | | 2.382 | |
| coefficient of thermal expansion [30–38° C.] ($\times 10^{-7}/°$ C.) temperature (° C.) | 33 | | 33 | | 33 | |
| strain point | 673 | | 674 | | 676 | |
| annealing point | 731 | | 732 | | 735 | |
| softening point | 989 | | 990 | | 987 | |

TABLE 12-continued

|  | Sample No. 34 | Sample No. 35 | Sample No. 36 |
|---|---|---|---|
| at viscosity $10^{4.0}$ | 1346 | 1345 | 1324 |
| at viscosity $10^{3.0}$ | 1519 | 1516 | 1498 |
| at viscosity $10^{2.5}$ | 1633 | 1630 | 1612 |
| Young's modulus (GPa) | 69 | 69 | 70 |
| specific modulus (GPa/(g · cm$^{-3}$)) | 29.0 | 29.0 | 29.4 |
| erosion as BHF resistance (μm) | 0.6 | 0.6 | 0.6 |
| evaluation of appearance | ○ | ○ | ○ |
| erosion as HCl resistance (μm) | 4.5 | 4.5 | 2.1 |
| evaluation of appearance | ○ | ○ | ○ |
| liquidus temperature (° C.) | 1082 | 1090 | 1105 |
| liquidus viscosity (dPa · s) | $10^{6.4}$ | $10^{6.3}$ | $10^{6.0}$ |

TABLE 13

|  | Sample No. 37 | | Sample No. 38 | | Sample No. 39 | |
|---|---|---|---|---|---|---|
|  | mass % | mol % | mass % | mol % | mass % | mol % |
| $SiO_2$ | 63.3 | 69.5 | 63.1 | 69.5 | 63.0 | 69.4 |
| $Al_2O_3$ | 15.9 | 10.3 | 15.9 | 10.3 | 15.9 | 10.3 |
| $B_2O_3$ | 10.4 | 9.9 | 10.4 | 9.9 | 10.4 | 9.9 |
| MgO | — | — | — | — | — | — |
| CaO | 7.6 | 9.0 | 7.6 | 9.0 | 7.6 | 9.0 |
| SrO | 1.0 | 0.7 | 0.5 | 0.3 | 0.5 | 0.3 |
| BaO | 0.5 | 0.2 | 1.2 | 0.5 | 1.2 | 0.5 |
| ZnO | — | — | — | — | — | — |
| $P_2O_5$ | — | — | — | — | — | — |
| $As_2O_3$ | — | — | — | — | 0.7 | 0.2 |
| $SnO_2$ | 0.1 | <0.05 | 0.1 | <0.05 | — | — |
| $Sb_2O_3$ | 1.0 | 0.2 | 1.0 | 0.2 | 0.5 | 0.1 |
| $ZrO_2$ | 0.1 | 0.1 | 0.1 | 0.1 | 0.1 | 0.1 |
| Cl | 0.1 | 0.2 | 0.1 | 0.2 | 0.1 | 0.2 |
| (BaO + SrO)/BaO | 3 | | 1.4 | | 1.4 | |
| density (g/cm$^3$) | 2.387 | | 2.388 | | 2.384 | |
| coefficient of thermal expansion [30-380° C.] (×10$^{-7}$/° C.) | 33 | | 33 | | 33 | |
| temperature (° C.) | | | | | | |
| strain point | 676 | | 671 | | 672 | |
| annealing point | 732 | | 729 | | 729 | |
| softening point | 987 | | 989 | | 989 | |
| at viscosity $10^{4.0}$ | 1327 | | 1348 | | 1342 | |
| at viscosity $10^{3.0}$ | 1501 | | 1525 | | 1516 | |
| at viscosity $10^{2.5}$ | 1612 | | 1639 | | 1628 | |
| Young's modulus (GPa) | 71 | | 69 | | 69 | |
| specific modulus (GPa/(g · cm$^{-3}$)) | 29.7 | | 28.7 | | 28.8 | |
| erosion as BHF resistance (μm) | 0.6 | | 0.6 | | 0.6 | |
| evaluation of appearance | ○ | | ○ | | ○ | |
| erosion as HCl resistance (μm) | 2.3 | | 2.1 | | 2.2 | |
| evaluation of appearance | ○ | | ○ | | ○ | |
| liquidus temperature (° C.) | 1101 | | 1099 | | 1101 | |
| liquidus viscosity (dPa · s) | $10^{6.1}$ | | $10^{6.2}$ | | $10^{6.1}$ | |

TABLE 14

|  | Sample No. 40 | | Sample No. 41 | | Sample No. 42 | |
| --- | --- | --- | --- | --- | --- | --- |
|  | mass % | mol % | mass % | mol % | mass % | mol % |
| $SiO_2$ | 61.2 | 68.6 | 60.2 | 68.0 | 61.1 | 68.9 |
| $Al_2O_3$ | 15.8 | 10.5 | 15.8 | 10.5 | 15.8 | 10.5 |
| $B_2O_3$ | 11.8 | 11.4 | 11.8 | 11.5 | 10.9 | 10.6 |
| MgO | — | — | — | — | — | — |
| CaO | 5.9 | 7.1 | 5.9 | 7.1 | 5.9 | 7.1 |
| SrO | 1.0 | 0.6 | 1.0 | 0.7 | 1.0 | 0.7 |
| BaO | 3.0 | 1.3 | 3.0 | 1.3 | 3.0 | 1.3 |
| ZnO | — | — | — | — | — | — |
| $P_2O_5$ | — | — | 1.0 | 0.5 | 1.0 | 0.5 |
| $As_2O_3$ | — | — | — | — | — | — |
| $SnO_2$ | — | — | — | — | — | — |
| $Sb_2O_3$ | 1.0 | 0.2 | 1.0 | 0.2 | 1.0 | 0.2 |
| $ZrO_2$ | 0.3 | 0.2 | 0.3 | 0.2 | 0.3 | 0.2 |
| Cl | — | — | — | — | — | — |
| (BaO + SrO)/BaO | 1.3 | | 1.3 | | 1.3 | |
| density (g/cm$^3$) | 2.403 | | 2.401 | | 2.405 | |
| coefficient of thermal expansion [30–380° C.] (×10$^{-7}$/° C.) temperature (° C.) | 32 | | 32 | | 32 | |
| strain point | 659 | | 654 | | 663 | |
| annealing point | 718 | | 713 | | 722 | |
| softening point | 977 | | 974 | | 986 | |
| at viscosity 10$^{4.0}$ | 1326 | | 1320 | | 1337 | |
| at viscosity 10$^{3.0}$ | 1512 | | 1512 | | 1514 | |
| at viscosity 10$^{2.5}$ | 1630 | | 1602 | | 1636 | |
| Young's modulus (GPa) | 68 | | 68 | | 68 | |
| specific modulus (GPa/(g · cm$^{-3}$)) | 28.3 | | 28.3 | | 28.3 | |
| erosion as BHF resistance (μm) | 0.4 | | 0.4 | | 0.4 | |
| evaluation of appearance | ○ | | ○ | | ○ | |
| erosion as HCl resistance (μm) | 4.5 | | 4.6 | | 2.6 | |
| evaluation of appearance | ○ | | ○ | | ○ | |
| liquidus temperature (° C.) | 1150 | | 1141 | | 1128 | |
| liquidus viscosity (dPa · s) | 10$^{5.5}$ | | 10$^{5.5}$ | | 10$^{5.8}$ | |

TABLE 15

|  | Sample No. 43 | | Sample No. 44 | | Sample No. 45 | |
| --- | --- | --- | --- | --- | --- | --- |
|  | mass % | mol % | mass % | mol % | mass % | mol % |
| $SiO_2$ | 62.1 | 69.5 | 62.1 | 69.4 | 61.2 | 68.5 |
| $Al_2O_3$ | 15.3 | 10.1 | 15.3 | 10.1 | 15.8 | 10.4 |
| $B_2O_3$ | 11.4 | 11.0 | 11.4 | 11.0 | 11.8 | 11.4 |
| MgO | — | — | — | — | 0.5 | 0.8 |
| CaO | 5.9 | 7.1 | 5.9 | 7.1 | 5.4 | 6.5 |
| SrO | 1.0 | 0.7 | 1.5 | 1.0 | 1.0 | 0.7 |
| BaO | 3.0 | 1.3 | 2.5 | 1.1 | 3.0 | 1.3 |
| ZnO | — | — | — | — | — | — |
| $P_2O_5$ | — | — | — | — | — | — |
| $As_2O_3$ | — | — | — | — | — | — |
| $SnO_2$ | — | — | — | — | — | — |
| $Sb_2O_3$ | 1.0 | 0.2 | 1.0 | 0.2 | 1.0 | 0.2 |
| $ZrO_2$ | 0.3 | 0.2 | 0.3 | 0.2 | 0.3 | 0.2 |
| Cl | — | — | — | — | — | — |
| (BaO + SrO)/BaO | 1.3 | | 1.6 | | 1.3 | |
| density (g/cm$^{-3}$) | 2.401 | | 2.402 | | 2.404 | |
| coefficient of thermal expansion [30–380° C.] (×10$^{-7}$/° C.) temperature (° C.) | 32 | | 33 | | 32 | |
| strain point | 660 | | 661 | | 659 | |
| annealing point | 721 | | 721 | | 718 | |
| softening point | 986 | | 985 | | 976 | |

TABLE 15-continued

|  | Sample No. 43 | Sample No. 44 | Sample No. 45 |
|---|---|---|---|
| at viscosity $10^{4.0}$ | 1331 | 1335 | 1319 |
| at viscosity $10^{3.0}$ | 1505 | 1517 | 1496 |
| at viscosity $10^{2.5}$ | 1610 | 1634 | 1600 |
| Young's modulus (GPa) | 68 | 68 | 69 |
| specific modulus (GPa/(g · cm$^{-3}$)) | 28.3 | 28.3 | 28.7 |
| erosion as BHF resistance ($\mu$m) | 0.4 | 0.4 | 0.4 |
| evaluation of appearance | ○ | ○ | ○ |
| erosion as HCl resistance ($\mu$m) | 2.6 | 2.6 | 4.4 |
| evaluation of appearance | ○ | ○ | ○ |
| liquidus temperature (° C.) | 1112 | 1091 | 1150 |
| liquidus viscosity (dPa · s) | $10^{6.0}$ | $10^{6.2}$ | $10^{5.4}$ |

TABLE 16

|  | Sample No. 46 | |
|---|---|---|
|  | mass % | mol % |
| $SiO_2$ | 61.1 | 68.1 |
| $Al_2O_3$ | 16.5 | 10.8 |
| $B_2O_3$ | 10.3 | 9.9 |
| MgO | — | — |
| CaO | 7.8 | 9.3 |
| SrO | 1.5 | 1.0 |
| BaO | 0.6 | 0.3 |
| ZnO | — | — |
| $P_2O_5$ | — | — |
| $As_2O_3$ | — | — |
| $SnO_2$ | — | — |
| $Sb_2O_3$ | 2.0 | 0.5 |
| $ZrO_2$ | 0.2 | 0.1 |
| Cl | — | — |
| (BaO + SrO)/BaO | 3.5 | |
| density (g/cm$^3$) | | 2.395 |
| coefficient of thermal expansion [30–380° C.] (×10$^{-7}$/° C.) | | 34 |
| temperature (° C.) | | |
| strain point | | 669 |
| annealing point | | 724 |
| softening point | | 975 |
| at viscosity | | |
| $10^{4.0}$ | | 1306 |
| $10^{3.0}$ | | 1472 |
| $10^{2.5}$ | | 1579 |
| Young's modulus (GPa) | | 70 |
| specific modulus (GPa/(g · cm$^3$)) | | 29.0 |
| erosion as BHF resistance ($\mu$m) | | 0.6 |
| evaluation of appearance | | ○ |
| erosion as HCl resistance ($\mu$m) | | 4.5 |
| evaluation of appearance | | ○ |
| liquidus temperature (° C.) | | 1050 |
| liquidus viscosity (dPa · s) | | $10^{6.5}$ |

TABLE 17

|  | Sample No. 47 | | Sample No. 48 | | Sample No. 49 | |
|---|---|---|---|---|---|---|
|  | mass % | mol % | mass % | mol % | mass % | mol % |
| $SiO_2$ | 56.0 | 63.2 | 58.0 | 62.8 | 57.8 | 67.7 |
| $Al_2O_3$ | 11.0 | 7.3 | 20.0 | 12.8 | 16.4 | 11.3 |
| $B_2O_3$ | 15.0 | 14.6 | 13.0 | 12.2 | 8.5 | 8.6 |
| MgO | — | — | 4.0 | 6.5 | 0.7 | 1.2 |
| CaO | 8.0 | 9.7 | 5.0 | 5.8 | 4.1 | 5.1 |
| SrO | 4.0 | 2.6 | — | — | 1.9 | 1.3 |
| BaO | 6.0 | 2.7 | — | — | 9.4 | 4.3 |
| ZnO | — | — | — | — | — | — |
| $P_2O_5$ | — | — | — | — | — | — |
| $As_2O_3$ | — | — | — | — | 1.2 | 0.4 |
| $SnO_2$ | — | — | — | — | — | — |
| $Sb_2O_3$ | — | — | — | — | — | — |
| $ZrO_2$ | — | — | — | — | — | — |
| Cl | — | — | — | — | — | — |

TABLE 17-continued

|  | Sample No. 47 | Sample No. 48 | Sample No. 49 |
|---|---|---|---|
| (BaO + SrO)/BaO | 1.6 | 0 | 2 |
| density (g/cm$^3$) | 2.529 | 2.351 | 2.554 |
| coefficient of thermal expansion [30–380° C.] (×10$^{-7}$/° C.) | 45 | 30 | 38 |
| temperature (° C.) | | | |
| strain point | 604 | 687 | 660 |
| annealing point | 649 | 732 | 716 |
| softening point | 840 | 972 | 968 |
| at viscosity 10$^{4.0}$ | 1119 | 1273 | 1310 |
| at viscosity 10$^{3.0}$ | 1313 | 1425 | 1480 |
| at viscosity 10$^{2.5}$ | 1405 | 1522 | 1588 |
| Young's modulus (GPa) | 66 | 75 | 71 |
| specific modulus (GPa/(g · cm$^{-3}$)) | 26.0 | 31.9 | 27.8 |
| erosion as BHF resistance (μm) | 0.4 | 1.1 | 0.9 |
| evaluation of appearance | ○ | X | ○ |
| erosion as HCl resistance (μm) | 11.5 | 9.8 | 1.5 |
| evaluation of appearance | x | X | ○ |
| liquidus temperature (° C.) | 1110 | 1250 or more | 1090 |
| liquidus viscosity (dPa · s) | 10$^{4.0}$ | 10$^{4.2}$ or less | 10$^{6.0}$ |

Each of the samples Nos. 1–49 in Tables was prepared in the following manner.

At first, a material batch prepared to have a composition as defined in Tables was put in a platinum crucible and melted at 1600° C. for 24 hours into a glass melt. Then, the glass melt was poured out onto a carbon plate and formed into a plate-like shape. Each of the samples Nos. 1–49 thus obtained was measured for various characteristics including the density, the coefficient of thermal expansion, the viscosity, the Young's modulus, the specific modulus, the BHF resistance, the HCl resistance, the liquidus temperature, and the liquidus viscosity. The result of measurement is shown in Tables.

As is obvious from Tables, each of the samples Nos. 1–46 did not contain alkali metal oxide and had a density not higher than 2.405 g/cm$^3$, a coefficient of thermal expansion of 31×10$^{-7}$/° C.–36×10$^{-7}$/° C., and a strain point not lower than 654° C. The specific modulus was not smaller than 27.9 GPa/(g·cm$^3$). The BHF resistance and the HCl resistance were evaluated excellent in that the erosion was not greater than 0.8 μm and was not greater than 7.3 μm, respectively. In the evaluation of appearance, no change was confirmed. A glass plate produced by the use of each of the samples Nos. 1 through 46 was small in heat shrinkage and sag, excellent in thermal shock resistance, and hardly warped. Thus, each of the samples Nos. 1 through 46 is suitable as the glass plate for the TFT-LCD.

Furthermore, each of the samples Nos. 1–46 was easily melted because the temperature corresponding to the high-temperature viscosity 10$^{2.5}$ dPa·s was not higher than 1650° C. The devitrification resistance was excellent because the liquidus temperature was not higher than 1150° C. and the liquidus viscosity was not lower than 10$^{5.4}$ dPa·s. Thus, each of the samples Nos. 1–46 had a low liquidus temperature and a high liquidus viscosity and was therefore adapted to be formed into a plate-like shape by the down-draw process. From the above, it is understood that each of the samples Nos. 1 through 46 is excellent in productivity.

Furthermore, each of the samples Nos. 1 through 46 was excellent in chemical resistance, high in specific modulus, and excellent in meltability. Therefore, each sample is suitable as a glass plate for various electronic devices, including a glass plate for a flat display, in particular, a glass plate for the a-Si•TFT-LCD and a glass plate for the p-Si•TFT-LCD.

By way of example, the sample No. 36 was melted in a test melting furnace and formed by the overflow down-draw process to produce a display glass plate having a thickness of 0.5 mm. The glass plate had a warp of 0.075% or less, the waviness (WCA) of 0.15 μm or less (cutoff fh: 0.8 mm, fl: 8 mm), the surface roughness (Ry) of 100 Å or less (cutoff λ c:9 μm). Thus, the surface accuracy was excellent so that the glass plate is suitable as a glass plate for the LCD.

On the other hand, the sample No. 47 had a density as high as 2.511 g/cm$^3$, a coefficient of thermal expansion as high as 45×10$^{-7}$/° C., and a strain point as low as 604° C. Furthermore, the erosion by HCl was as large as 11.5 μm. In the visual observation after the HCl treatment, haze and cracks were confirmed.

For the sample No. 48, the erosion by BHF and the erosion by HCl were as large as 1.1 μm and 9.8 μm, respectively. In the visual observation after the BHF treatment, roughness of the surface was confirmed. In the visual observation after the HCl treatment, haze was confirmed. Furthermore, the liquidus temperature was as high as 1250° C. or more so that the devitrification resistance was poor.

The sample No. 49 had a density as high as 2.554 g/cm$^3$ so that the glass plate of a large size and a thin thickness is difficult to obtain. Since the coefficient of thermal expansion was as high as 38×10$^{-7}$/° C. so that the thermal shock resistance was inferior. Because of some difference in coefficient of thermal expansion from the TFT material, the warp might possibly be caused.

The density in Tables was measured by the known Archimedes method.

The coefficient of thermal expansion was measured by the use of a dilatometer as an average coefficient of thermal expansion within a temperature range between 30 and 380° C.

The strain point and the annealing point were measured according to the method ASTM C336–71. The higher these points are, the higher the heat resistance of the glass is. The softening point was measured according to the method ASTM C338–93. The temperatures corresponding to the viscosities $10^{4.0}$ dPa·s, $10^{3.0}$ dPa·s, and $10^{2.5}$ dPa·s were measured by the platinum ball pull up method. The temperature corresponding to the high-temperature viscosity $10^{2.5}$ dPa·s represents the melting temperature. The lower the temperature is, the more excellent the meltability is.

The Young's modulus was measured by the resonance method. The specific modulus was calculated from the Young's modulus and the density.

The BHF resistance and the HCl resistance were evaluated in the following manner. At first, both surfaces of each glass sample were subjected to optical polishing. Thereafter, the glass sample with a part covered with a mask was dipped in a chemical solution having a predetermined concentration at a predetermined temperature for a predetermined time period. After the chemical treatment, the mask was removed. The difference in level of a masked part (i.e., an uneroded part) and an unmasked part (i.e., an eroded part) was measured as the erosion by the surface roughness meter. On the other hand, after the both surfaces of each glass sample were subjected to optical polishing and then the glass sample was dipped into the chemical solution of a predetermined concentration at a predetermined temperature for a predetermined time period, the surface of the glass was visually observed. The sample exhibiting haze, roughness, and cracks on the surface is labelled X while the sample exhibiting no change is labelled o.

The erosion as the BHF resistance was measured by the use of the 130 BHF solution ($NH_4HF$: 4.6 mass%, $NH_4F$: 3.6 mass%) under the treating condition of 20 °C. and 30 minutes. The evaluation of appearance was carried out by the use of the 63 BHF solution (HF: 6 mass%, $NH_4F$: 30 mass%) under the treating condition of 20° C. and 30 minutes. On the other hand, the erosion as the HCl resistance was measured by the use of the 10 mass% HCl aqueous solution under the treating condition of 80° C. and 24 hours. The evaluation of appearance was carried out by the use of the 10 mass% HCl aqueous solution under the treating condition of 80° C. and 3 hours.

The liquidus temperature was measured in the following manner. Each glass sample was pulverized. Glass powder filtered by a standard filter of 30 mesh (500 μm) and trapped by a 50 mesh (300 μm) was put in a platinum boat and held in a gradient heating furnace for 24 hours. At the time when the crystal was deposited, the temperature was measured as the liquidus temperature.

The liquidus viscosity represents the viscosity of the glass at the liquidus temperature. The lower the liquidus temperature is and the higher the liquidus viscosity is, the more excellent the devitrification resistance and the formability are. In order to successfully form the display glass plate by the down-draw process, it is desired that the liquidus temperature is not higher than 1150° C. (preferably not higher than 1100° C.) and the liquidus viscosity is not lower than $10^{5.4}$ dPa·s (preferably not lower than $10^6$ dPa·s).

What is claimed is:

1. An alkali-free glass cons sting essentially of, in mass percent, 58–70% $SiO_2$, 10–19% $Al_2O_3$, 6.5–15% $B_2O_3$, 0–2% MgO, greater than 8%–12% CaO, 0.1–2% BaO, 0–4% SrO, 0.1–6% BaO+SrO, 0–5% ZnO, 5–12% MgO+CaO+BaO+SrO+ZnO, 0–5% $ZrO_2$, 0–5% $TiO_2$, and 0–5% $P_2O_5$, containing substantially no alkali metal oxide, being formed into a plate shape by the down-drawn process, and having a density of 2.40 g/cm³ or less, an average coefficient of thermal expansion of $25\times10^{-7}$/° C.–$36\times10^{-7}$/° C. within a temperature range between 30 and 380° C. and a strain point not lower than 640° C., in which the liquidus temperature is not higher than 1130° C., and the viscosity at the liquidus temperature being not lower than $10^{5.4}$ dPa·s.

2. An alkali-free glass according to claim 1, wherein a ratio (BaO+SrO)/BaO falls within a range of 1.1–10 in mass ratio.

3. An alkali-free glass according to claim 1, wherein the erosion of the alkali-free glass is not greater than 10 μm after treatment by a 10% HCl aqueous solution under the condition of 80° C. and 24 hours and neither haze nor roughness of the alkali-free glass is confirmed by visual observation after treatment by a 10% HCl aqueous solution under the condition of 80° C. and 3 hours.

4. An alkali-free glass according to claim 1, wherein the erosion of the alkali-free glass is not greater than 0.8 μm after treatment by a 130 BHF solution under the condition of 20° C. and 30 minutes and neither haze nor roughness of the alkali-free glass is confirmed by visual observation after treatment by a 63 BHF solution under the condition of 20° C. and 30 minutes.

5. An alkali-free glass according to claim 1, wherein the alkali-free glass has a specific modulus not smaller than 27.5 GPa/(g·cm$^{-3}$).

6. An alkali-free glass according to claim 1, wherein the alkali-free glass does not contain $As_2O_3$ but contains 0.5–3.0 wt % $Sb_2O_3+Sb_2O_5+SnO_2+Cl$.

7. An alkali-free glass according to claim 1, wherein the alkali-free glass consists essentially of, in mass percent, 60–68% $SiO_2$, 12–18% $Al_2O_3$, 7–12% $B_2O_3$, 0–2% MgO, greater than 8%–10% CaO, 0.3–2% BaO, 0.1–2.7% SrO, 0.4% or more and less than 3% BaO+SrO, 0–0.9% ZnO, 5–12% MgO+CaO+BaO+SrO+ZnO, 0–1% $ZrO_2$, 0–1% $TiO_2$, and 0–1% $P_2O_5$.

8. A glass plate formed by a alkali-free glass consisting essentially of, in mass percent, 58–70% $SiO_2$, 10–19% $Al_2O_3$, 6.5–15% $B_2O_3$, 0–2% MgO, greater than 8%–12% CaO, 0.1–2% BaO, 0–4% SrO, 0.1–6% BaO+SrO, 0–5% ZnO, 5–12% MgO+CaO+BaO+SrO+ZnO, 0–5% $ZrO_2$, 0–5% $TiO_2$, and 0–5% $P_2O_5$, containing substantially no alkali metal oxide, being formed into a plate shape by the down-draw process and having a density of 2.40 g/cm³ or less, an average coefficient of thermal expansion of $25\times10^{-7}$/° C.–$36\times10^{-7}$/° C. within a temperature rang between 30 and 380° C., and a strain point not lower than 640° C., in which the liquidus temperature is not higher than 1130° C., and the viscosity at the liquidus temperature being not lower than $10^{5.4}$ dPa·s.

9. A glass plate according to claim 8, wherein the glass plate is used for a flat display.

10. A glass plate according to claim 8, wherein the glass plate has a thickness of 0.6 mm or less.

11. A glass plate according to claim 8, wherein the alkali-free glass consists essentially of, in mass percent, 60–68% $SiO_2$, 12–18% $Al_2O_3$, 7–12% $B_2O_3$, 0–2% MgO, greater than 8%–10% CaO, 0.3–2% BaO, 0.1–2.7% SrO, 0.4% or more and less than 3% BaO+SrO, 0–0.9% ZnO, 5–12% MgO+CaO+BaO+SrO+ZnO, 0–1% $ZrO_2$, 0–1% $TiO_2$, and 0–1% $P_2O_5$.

12. A polycrystal silicon TFT liquid crystal display comprising a glass plate claimed in claim 8.

13. A liquid crystal display comprising a glass plate formed by an alkali-free glass consisting essentially of, in mass percent, 58–70% $SiO_2$, 10–19% $Al_2O_3$, 6.5–15%

$B_2O_3$, 0–2% MgO, greater than 8%–12% CaO, 0.1–2% BaO, 0–4% SrO, 0.1–6% BaO+SrO, 0–5% ZnO, 5–12% MgO+CaO+BaO+SrO+ZnO, 0–5% $ZrO_2$, 0–5% $TiO_2$, and 0–5% $P_2O_5$, containing substantially no alkali metal oxide, being formed into a plate shape by the down-draw process and having a density of 2.40 q/cm³ or less, an average coefficient of thermal expansion of $25\times10^{-7}/°$C.–$36\times10^{-7}/°$C. within a temperature range between 30 and 380° C., and a strain point not lower than 640° C., in which the liquidus temperature is not higher than 1130° C., and the Viscosity at the liquidus temperature being not lower than $10^{5.4}$ dPa·s.

14. A liquid crystal display according to claim 13, wherein the alkali-free glass consists essentially of, in mass percent, 60–68% $SiO_2$, 12–18% $Al_2O_3$, 7–12% $B^2O_3$, 0–2% MgO, greater than 8%–10% CaO, 0.3–2% BaO, 0.1–2.7% SrO, 0.4% or more and less than 3% BaO+SrO, 0–0.9% ZnO, 5–12% MgO+CaO+BaO+SrO+ZnO, 0–1% $ZrO_2$, 0–1% $TiO_2$, and 0–1% $P_2O_5$.

* * * * *

UNITED STATES PATENT AND TRADEMARK OFFICE
CERTIFICATE OF CORRECTION

PATENT NO. : 6,881,692 B2
DATED : April 19, 2005
INVENTOR(S) : Murata et al.

Page 1 of 1

It is certified that error appears in the above-identified patent and that said Letters Patent is hereby corrected as shown below:

Column 27,
Line 62, please delete "cons sting" to correctly read -- consisting --.

Signed and Sealed this

Twenty-eighth Day of June, 2005

JON W. DUDAS
*Director of the United States Patent and Trademark Office*